(12) United States Patent
Yu

(10) Patent No.: US 10,568,432 B2
(45) Date of Patent: Feb. 25, 2020

(54) FOLDABLE FIVE-STAR FOOT

(71) Applicant: ANJI JINTAI FASTENER CO., LTD., Zhejiang (CN)

(72) Inventor: Jinqian Yu, Zhejiang (CN)

(73) Assignee: ANJI JINTAI FASTENER CO., LTD., Huzhou (CN)

( * ) Notice: Subject to any disclaimer, the term of this patent is extended or adjusted under 35 U.S.C. 154(b) by 127 days.

(21) Appl. No.: 15/574,490

(22) PCT Filed: Sep. 30, 2016

(86) PCT No.: PCT/CN2016/101185
§ 371 (c)(1),
(2) Date: Nov. 16, 2017

(87) PCT Pub. No.: WO2018/058567
PCT Pub. Date: Apr. 5, 2018

(65) Prior Publication Data
US 2019/0208912 A1    Jul. 11, 2019

(51) Int. Cl.
*A47C 4/20* (2006.01)
*A47B 91/00* (2006.01)
(Continued)

(52) U.S. Cl.
CPC .............. *A47C 4/20* (2013.01); *A47B 91/00* (2013.01); *A47C 3/20* (2013.01); *A47C 4/00* (2013.01);
(Continued)

(58) Field of Classification Search
CPC .. A47C 4/20; A47C 3/20; A47C 7/004; A47C 4/00; A47B 91/00; F16B 12/46; F16M 11/20
(Continued)

(56) References Cited

U.S. PATENT DOCUMENTS 2,653,000 A * 9/1953 Cadwell ................ F16M 11/16
  248/168
4,010,922 A * 3/1977 Heller ...................... A47C 4/02
  248/165
(Continued)

FOREIGN PATENT DOCUMENTS

| CN | 101926565 A | 12/2010 |
| CN | 105124963 A | 12/2015 |

(Continued)

*Primary Examiner* — Nkeisha Smith
(74) *Attorney, Agent, or Firm* — NZ Carr Law Office

(57) ABSTRACT

Disclosed is a foldable five-star foot, comprising a center body and five legs; each one of the legs is provided with a first mounting block and a second mounting block; each one of the first mounting blocks corresponds to a first mounting groove; each one of the second mounting blocks corresponds to a second mounting groove; and the first and second mounting grooves are formed on the center body. The first mounting groove and the second mounting groove are internally provided with a pair of a first connecting block and a second connecting block; each one of the first connecting blocks is connected with each corresponding one of the first mounting blocks, and each one of the second connecting blocks is connected with each corresponding one of the second mounting blocks. The five-star foot is advantaged in simple and reliable structure, convenient folding, large application scope and easy popularization.

10 Claims, 4 Drawing Sheets

(51) Int. Cl.
*A47C 3/20* (2006.01)
*A47C 7/00* (2006.01)
*A47C 4/00* (2006.01)
*F16M 11/00* (2006.01)
*F16B 12/46* (2006.01)
*F16M 11/20* (2006.01)

(52) U.S. Cl.
CPC ............... *A47C 7/00* (2013.01); *A47C 7/004* (2013.01); *F16B 12/46* (2013.01); *F16M 11/00* (2013.01); *F16M 11/20* (2013.01)

(58) Field of Classification Search
USPC ....... 248/188.6, 188.7, 188.1, 188.8, 346.01, 248/346.03, 688, 677, 678, 166, 177.1, 248/187.1, 188, 434; 108/158.11
See application file for complete search history.

(56) References Cited

U.S. PATENT DOCUMENTS

| | | | | |
|---|---|---|---|---|
| 4,036,462 A * | 7/1977 | Sheftel | ................ | G10G 5/00 211/203 |
| 4,744,536 A * | 5/1988 | Bancalari | ............ | A61M 5/1415 248/125.8 |
| 5,437,425 A * | 8/1995 | Hou | ................ | A47C 7/004 248/166 |
| 5,839,706 A * | 11/1998 | Liu | ................ | A47D 13/043 248/188 |
| 9,625,791 B2 * | 4/2017 | Harrison | ............... | G03B 17/561 |
| 9,920,876 B2 * | 3/2018 | Prugue | ................ | A42B 3/04 |
| 2004/0212238 A1 | 10/2004 | Chen | | |
| 2008/0150338 A1* | 6/2008 | Baum | ................ | A47B 9/00 297/311 |
| 2008/0224521 A1* | 9/2008 | Topping | ................ | A47C 9/027 297/338 |

FOREIGN PATENT DOCUMENTS

| | | |
|---|---|---|
| CN | 106175219 A | 12/2016 |
| CN | 106175222 A | 12/2016 |
| DE | 20307192 U1 | 9/2003 |
| GB | 2010197 A | 11/2004 |
| GB | 2010197 B | 3/2005 |

\* cited by examiner

FOLDABLE FIVE-STAR FOOT

BACKGROUND OF THE DISCLOSURE

Technical Field

The present disclosure belongs to the technical field of base structure of supporting devices, and in particular relates to a foldable five-star foot.

Description of the Related Art

Swivel chair feet are also called five-star feet, which are common accessories of swivel chairs and office chairs. The swivel chair feet are equipped with lifting cylinders to support swivel chairs. The existing swivel chair feet are usually radiative integrated structures. On one hand, when one of the legs is broken, the whole five-star foot is required to be replaced, causing unnecessary waste. On the other hand, the integrated structure occupies space, in particular the space of container when the five-star foot is stored or transported, resulting in high transport cost and increasing expenses of enterprises. Existing easily operable foldable five-star feet are easily folded, but the use strength of the five-star feet is lowered by different degrees. Besides, among the existing products, the folded feet tend to separate from the center body, adding unnecessary complicated operations for the next installation. Moreover, existing five-star feet have the problem of tending to unfold by accidents after being folded, affecting use.

A Chinese patent with patent number CN 105124963 A, published on Dec. 9, 2015, discloses a five-star foot capable of contained, including a center body and legs disposed on the center body, wherein the center body is provided with mounting portions corresponding to the legs; the legs are hinged with the mounting portions; the center body is provided with limiting mechanisms for limiting the rotation of the legs; and the legs and the center body are connected in a hinged way, and the legs are limited and fixed through the limiting mechanisms.

However, such five-star foot has problems of unstable structure and poor service effect.

BRIEF SUMMARY OF THE DISCLOSURE

The objective of the present disclosure is to provide a foldable five-star foot that can complete the connection and fixation of the legs and the center through an efficient clamping structure, and ensure that the five-star foot is capable of being effectively folded. The five-star foot has the advantages of simple and reliable structure, convenient folding, large application scope and easy popularization.

The technical solution adopted by the present disclosure to solve the above problems is as follows. A foldable five-star foot includes a center body and five legs; each one of the legs is provided with a first mounting block and a second mounting block, wherein each one of the first mounting blocks corresponds to a first mounting groove, each one of the second mounting blocks corresponds to a second mounting groove, the first mounting groove and the second mounting groove are formed on the center body; wherein the first mounting groove and the second mounting groove are both internally provided with a pair of a first connecting block and a second connecting block, each one of the first connecting blocks is connected with each corresponding one of the first mounting blocks, and each one of the second connecting blocks is connected with a corresponding one of the second mounting blocks. In this technical solution, the mode of matching between two grooves and two connecting blocks is adopted, so the five-star foot has advantages of high connection strength and good plastic molding effect along with preventing plastics from shrinking and collapsing.

According to a further preferred technical solution, each one of the first mounting blocks is provided with a first connecting groove; each one of the second mounting blocks is provided a second connecting groove; each one of the first connecting grooves is clamped with each corresponding one of the first connecting blocks and each one of the second connecting grooves is clamped with each corresponding one of the second connecting blocks to connect and fix each corresponding one of the legs.

According to a further preferred technical solution, each one of the first connecting blocks is provided with a first limiting block for limiting and fixing each corresponding one of the unfolded legs, and each one of the first mounting blocks and each one of the second mounting blocks are provided with a first limiting portion matched with each corresponding one of the first limiting blocks.

According to a further preferred technical solution, each one of the second connecting blocks is provided with a second limiting block for limiting and fixing each corresponding one of the unfolded legs; each one of the first mounting blocks and each one of the second mounting blocks are provided with a second unfolding limiting portion and a second folding limiting portion, wherein each one of the second unfolding limiting portions and each one of the second folding limiting portions are matched with each corresponding one of the second limiting blocks. In the technical solution, the second limiting blocks located in the middle portions of the first mounting grooves and the second mounting grooves has an effect of limiting and fixing the unfolded and folded legs, playing the majority of the limiting and fixing role from the axial middles of the legs, and ensuring the strength and stability of the fixed connection.

According to a further preferred technical solution, each one of the first mounting blocks and each one of the second mounting blocks are respectively provided with a connecting block slide through which each one of the first connecting blocks passes to enter each corresponding one of the first connecting grooves; a connecting block clamping point which prevents each one of the first mounting blocks from slipping out and protrudes toward the inside of each one of the connecting block slides is disposed between each one of the connecting block slides and each corresponding one of the first connecting grooves; and each one of the first connecting grooves is provided with a clamping point open cavity in which each one of the clamping block clamping points deforms and rebounds. In the technical solution has the advantage of ensuring that the first connecting is smoothly clamped and preventing the first connecting block from slipping off by accident. The connecting block clamping point rebounds after the first connecting block enters the first connecting groove, playing the role of preventing the first connecting block from slipping off to a limited degree; besides, the clamping point cavity ensures that the connecting block clamping block is capable of smoothly moving back when the legs are removed out, namely when the first connecting block is pulled out, thus ensuring smooth dismantling of the leg.

According to a further preferred technical solution, the distance from an end corner of each one of the connecting block clamping points that protrudes toward each corresponding one of the sliding block connecting slides to a lateral side of each corresponding one of the connecting block slides h is 0.5-3.0 cm. In the technical solution, the connecting block clamping point has the characteristic that the inclination angle of a lateral side which is connected with the connecting block slide is smaller than the inclination angle of the upper shorter side of the connecting block clamping point, ensuring that the first connecting blocks enters the first connecting groove without much labor and slides out of the first connecting groove with much labor; moreover, the distance reserved between the connecting block clamping point and the connecting block slide for the slip-out action is smaller than the distance of the connecting block slide, and the whole connecting block slide is the path where the first connecting block speeds up in sliding to enter the first connecting groove, so the entrance of the first connecting block is more difficult than slipping off, ensuring the connection effect of the legs.

According to a further preferred technical solution, the center body is provided with an upper stopper portion, and each one of the legs is provided with a leg upper protruding portion that is matched with the upper stopper portion for limiting and fixing each corresponding one of the legs. In the technical solution, each one of the upper stopper portions, matched with each corresponding one of the leg upper protruding portions, serve as the upper limiting and supporting structure of each one of the legs, ensuring the stability of the connection structure of the legs and the center body in the force bearing state.

According to a further preferred technical solution, the first mounting groove is internally provided with a first mounting block stopper which is clamped with the first mounting blocks on each one of the folded legs, wherein the first mounting block stopper is provided with first stopper protruding points, each one of the first mounting blocks is provided with a first protruding point groove which is clamped with each corresponding one of the first stop protruding points; the second mounting groove is internally provided with a second mounting block stopper which is matched with the second mounting blocks of each one of the folded legs, wherein the second mounting block stopper is provided with each second stopper protruding points, and each one of the second mounting blocks is provided with a second protruding point groove which is clamped with each corresponding one of the second stopper protruding points.

According to a further preferred technical solution, the inner and outer sides of each one of the second limiting blocks are two lateral faces which respectively correspond to the second unfolding limiting portion and the second folding limiting portion and are used to limit and fix each corresponding one of the legs; each one of the first limiting blocks is provided with inside faces for limiting and fixing each corresponding one of the unfolded legs, and the vertical length and overall volume of each one of the second limiting blocks are greater than the vertical length and overall volume of each one of the first limiting blocks. In the technical solution, the second limiting blocks are clamped and limited from the axial middle portions of the legs; as the main clamping components in the axial direction, the second limiting blocks are bigger than the first limiting blocks, ensuring the effect of "main bearing and clamping point in the middle, and auxiliary clamping points on two sides", and ensuring the connection strength of the legs 2 and the center body.

According to a further preferred technical solution, each one of the first mounting blocks is provided with a mounting black notch and each one of the second mounting blocks is provided with a mounting block notch. In the technical solution, the mounting block notches prevent the thicker parts of the first mounting blocks and the second mounting blocks from shrinking and collapsing, avoiding the collapse caused by large thickness, ensuring strength in use, and saving materials.

The present disclosure can complete the connection and fixation of the legs and the center through an efficient clamping structure, and ensure that the five-star foot is capable of being effectively folded. The five-star foot has the advantages of simple and reliable structure, convenient folding, large application scope and easy popularization.

DETAILED DESCRIPTION OF THE DISCLOSURE

The following are merely preferred embodiments of the present disclosure, and should not be regarded as limit to the scope of the present disclosure.

Embodiments

Figure 1:
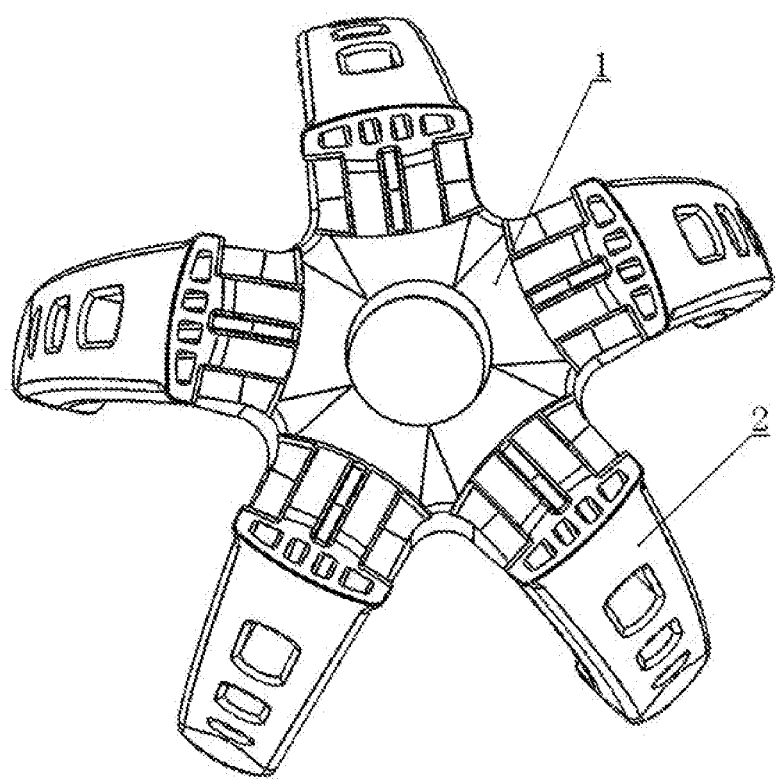
FIG. 1 is a structural view of the present disclosure in a folded state.
Figure 2:
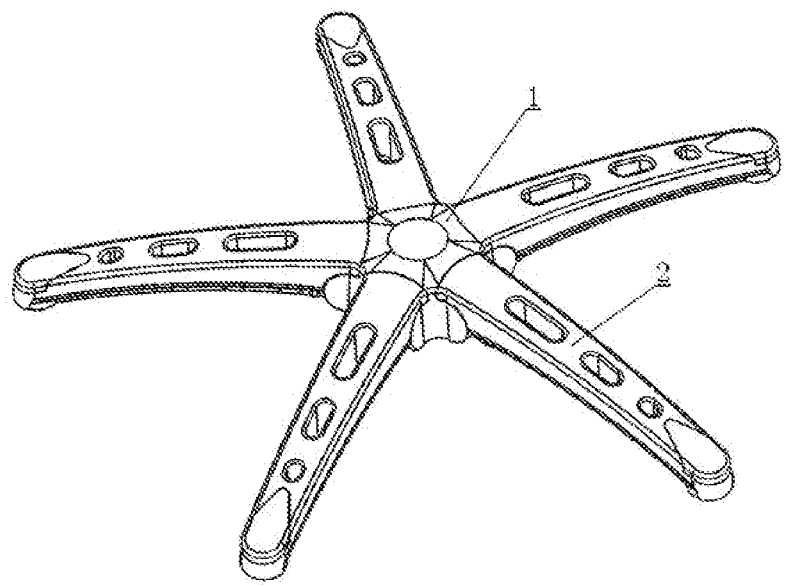
FIG. 2 is a structural view of the present disclosure in an unfolded state.
Figure 3:
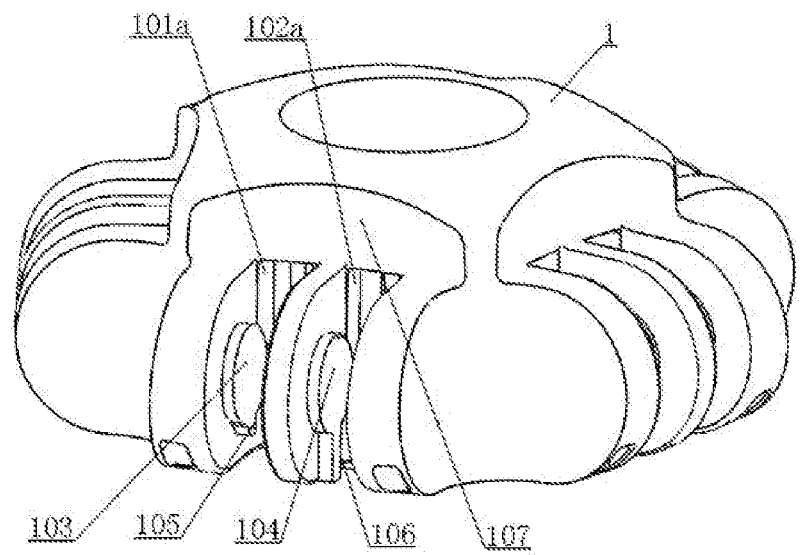
FIG. 3 is a schematic view of a side structure a center body in the present disclosure.
Figure 4:
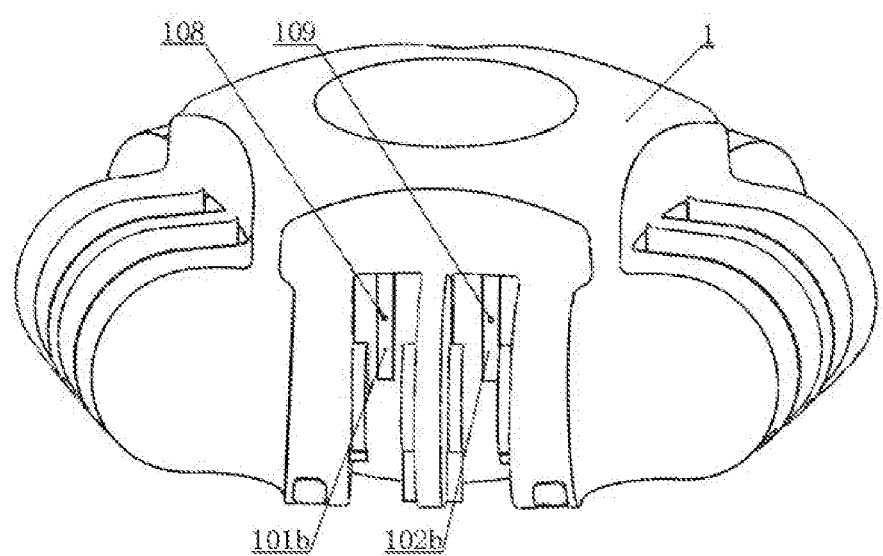
FIG. 4 is a schematic view of a side structure of the center body in the present disclosure.
Figure 5:
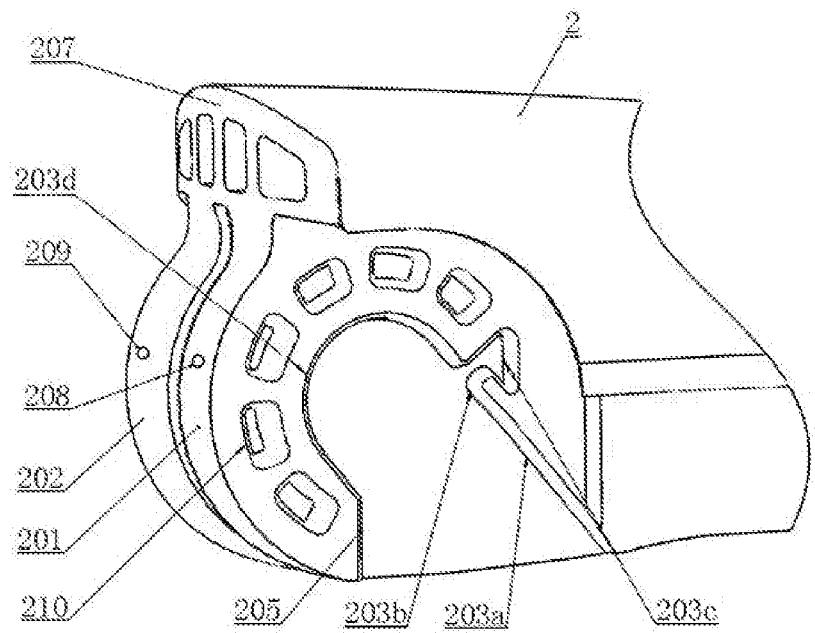
FIG. 5 is a schematic view of a side structure of a leg connection in the present disclosure.
Figure 6:
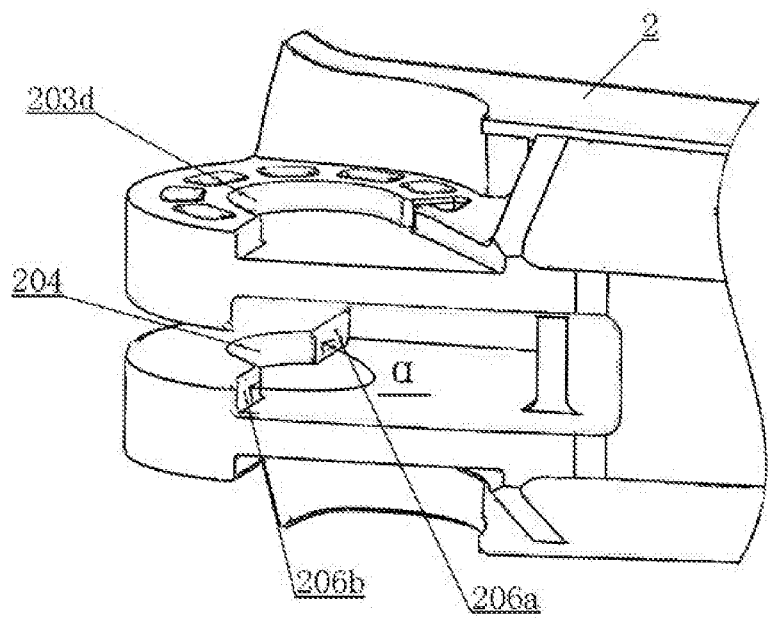
FIG. 6 is a schematic view of a side structure of the leg connection in the present disclosure.
Figure 7:
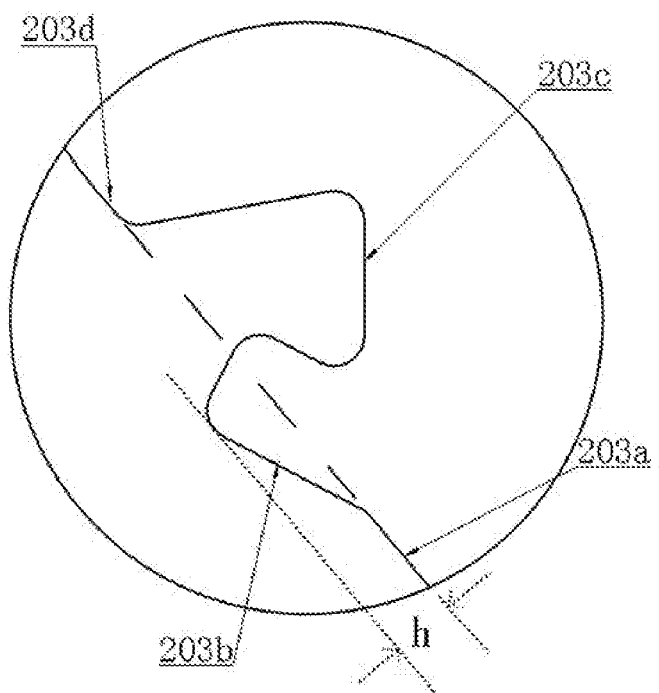
FIG. 7 is a structural view of a clamping point position of a connecting block in the present disclosure.

As shown in FIG. 1-7, a foldable five-star foot includes a center body 1 and five legs 2. The center body 1 is provided with a first mounting groove 101a and a second mounting groove 102a for realizing folding and unfolding actions of the center body 1 and legs 2 by means of rotation. Correspondingly, each one of the legs 2 is provided with a first mounting block 201 and a second mounting block 202, forming two groups of connecting structures. The first mounting blocks 201 and the second mounting blocks 202 are clamped in the first mounting groove 101a and the second mounting groove 102a to ensure the reliability and effectiveness of connection, wherein the first mounting groove 101a is internally provided with a pair of a first connecting block 103 and a second connecting block 104, the second mounting groove 102a is provided with a pair of a first connecting block 103 and a second connecting block 104, each one of the first connecting blocks 103 is matched with a groove position on each corresponding one of the first mounting blocks 201, and each one of the second connecting blocks 104 is matched with a groove position on each corresponding one of the second mounting blocks 202, thus performing clamping connection and limiting fixation. In this embodiment, the legs 2 are connected with the center body 1, adopting the mode of matching between two grooves and two connecting blocks. Compared with the mode of direct clamping between a single groove and a single connecting block, the present disclosure has the characteristic of saving materials on the basis of ensuring strength. Besides, coordinated with the characteristics of a little narrow outer sides of the first mounting groove 101a and the second mounting groove 102a and natural elastic deformation of the inner sides of the first and second mounting grooves, the clamping installation is compact and firm. In particular, when the five-star foot is made of plastics and when the plastic block has a relatively large thickness, the injection plastic products tend to present shrinkage and collapse of different degrees according to the existing molding processing conditions, and the collapse degree is directly relevant to the thickness of the plastic block. The two-groove structure adopted just reduces the thickness of the plastic block at the joint, lowers the effects of the plastic collapse on the quality of the five-star foot itself, and also ensures the strength of connection between the center body 1 and the legs 2.

Each one of the first mounting blocks 201 is provided with a first connecting groove 203d in a clamping connection with each corresponding one of the first connecting blocks 103 and a second connecting groove 204 in a clamping connection with each corresponding one of the second connecting blocks 104. Correspondingly, each one of the second mounting block 202 is also provided with a first connecting groove 203d in a clamping connection with each corresponding one of the first connecting blocks 103 and a second connecting groove 204 in a clamping connection with each corresponding one of the second connecting blocks 104. The first connecting grooves 203d are disposed in pair on the outer side of each one of the first mounting blocks 201 and on the outer side of each one of the second mounting blocks 202. The second connecting grooves 204 are disposed in pair on the inner side of each one of the first mounting blocks 201 and on the inner side of each one of the second mounting blocks 202. Such configuration mode corresponds to the inside-outside position relationship in which the first connecting blocks 103 are disposed on two sides of the first mounting groove 101a and on the two sides of the second mounting groove 102a and the second connecting blocks 104 stand upright on a partition board between the first mounting groove 101a and the second mounting groove 102a.

In this embodiment, each one of the first connecting blocks 103 is provided with a first limiting block 105 for limiting each corresponding one of the legs 2 after each corresponding one of the legs 2 is completely unfolded; each one of the first limiting blocks 105 is effectively clamped with a first unfolding limiting portion 205 disposed on each one of the legs 2, wherein the first limiting portions 205, also corresponding to the characteristic, namely two sides of each one of the first connecting blocks 103, are also respectively disposed on two outer sides of each one of the first mounting blocks 201 and on the two outer sides of each one of the second mounting blocks 202, limiting and fixing each one of the legs 2 from two sides thereof, and playing a one-to-one correspondence role.

Similarly, each one of the second connecting blocks 104 is provided with a second limiting block 106 for limiting each corresponding one of the legs 2 after each corresponding one of the legs 2 is completely unfolded; each one of the second limiting blocks 106 is effectively clamped with a second unfolding limiting portion 206b disposed on each one of the legs 2, wherein each one of the second unfolding limiting portions 206b, also corresponding to the characteristic, namely the middle position of each one of the second connecting blocks 104, is clamped and fixed with the axial middle position of each one of the legs 2, ensuring the main fixing effect. The two second unfolding limiting portions 206b are respectively disposed on the inner side of each one of the first mounting blocks 201 and on the inner side of each one of the second mounting blocks 202, playing a one-to-one correspondence role.

The difference between the second limiting block 106 and the first limiting block 105 is as follows. Each one of the second limiting blocks 106 is provided with two planes for limiting and fixing, wherein the plane close to the inner sides of the first mounting groove 101a and the second mounting groove 102a is matched with each one of the second unfolding limiting portions 206b when each one of the legs 2 is completely unfolded, realizing unfolding limiting; the other plane of each one of the second limiting block 106 that is away from the inner sides of the first mounting blocks 201 and the second mounting blocks 202 is used for realizing folding limiting on each one of the legs 2 after each one of the legs 2 is completely folded. The limiting function is conducted by means of the second folding limiting portions 206a disposed on the inner sides of the first mounting groove 101a and the second mounting groove 102a. The key is that, when the rotating angle is of each one of the legs 2 from the unfolding state to the folded state is a, each one of the second folding limiting portions 206a and each one of the second unfolding limiting portions 206b serve as two limiting planes, forming an included angle which should be also be a, and the two planes should be vertical tangent faces which constitute the round ring of each one of the second connecting grooves 204, wherein a is in a scope of 90°-110°, In this way, it can be ensured that the clamping and fixing effects are obtained in the unfolding state and the folded state. In this embodiment, each one of the second limiting blocks 106 is a "main limiting block" with a dual effect of unfolding limiting and folding limiting, having a "long and large" characteristic in comparison with each one of the first limiting blocks 105. Each one of the first limiting blocks 105 merely has a relatively small limiting plane for unfolding limiting, and is a small-sized protruding "auxiliary limiting block". The design of performing main limiting in the middle of each one of the legs 2 and auxiliary limiting on two sides of each one of the leg 2, compared with the design of performing main limiting on two sides of each one of the leg 2, has the advantages of preventing the legs 2 from being broken to the maximum extent, ensuring limiting strength, saving materials and simplifying manufacturing process.

In the process that the legs 2 are installed on and clamped with the center body 1, each one of the second connecting blocks 104 is directly clamped in each corresponding one of the open connecting grooves 204, realizing simple and effective clamping and fixing. However, when each one of the first connecting blocks 103 is clamped in each corresponding one of the first connecting grooves 203d from the outer sides of each corresponding one of the first mounting blocks 201 and each one of the second mounting blocks 202, a docking link and an anti-slipping off treatment are needed for the purpose of, first, ensuring the most basic feasibility and effectiveness of the clamping action, and second, ensuring the persistence and durability after the legs 2 are clamped and fixed.

In this embodiment, in order to ensure the feasibility and effectiveness of the clamping action, each one of the first mounting blocks 201 and each one of the second mounting blocks 202 are both provided with a connecting block slide 203a on respective outer side for the purpose of allowing each one of the first connecting blocks 103 to enter each corresponding one of the first connecting grooves 203d to complete the clamping action, and a connecting block clamping point 203b which extends toward the interior of each one of the connecting block slides 203a is disposed at a lateral position between each corresponding one of the sliding block slides 203a and each corresponding one of the first connecting blocks 203d. When each one of the first connecting block clamping points 203b enters each corresponding one of the first connecting grooves 203d, each one of the connecting block clamping points 203b generates deformation toward a lateral side of each corresponding one of the connecting block slides 203a due to extrusion by each corresponding one of the first connecting blocks 103, so that each one of the first connecting blocks 103 can smoothly enter each corresponding one of the first connecting blocks 203d, and after each one of the first connecting blocks 103 enters each corresponding one of the first connecting grooves 203d, each one of the connecting block clamping points 203b rebounds and recovers to the original shapes and positions due to the disappearance of the extrusion effect, ensuring that the each one of the first connecting blocks 103 is prevented from slipping out of each corresponding one of the first connecting grooves 203d, ensuring the firmness of connection between the legs 2 and the center body 1, and avoiding damage caused by separation between the legs and the center body during storage and transportation. In order to ensure the effectiveness of the deformation action after the connecting block clamping points 203b are extruded, each one of the connecting block slides 203a is provided with a clamping point open cavity 203c reserved for each one of the connecting block clamping points 203b, and each one of the clamping point open cavities 203c used for accommodating each corresponding one of the connecting block clamping points 203b when each corresponding one of the connecting block clamping points 203b deforms toward the lateral side and used for ensuring smooth rebounding achieves the effect of preventing each corresponding one of the first connecting blocks 103 from slipping out, and ensures the effectiveness of the deformation action. In this embodiment, each one of the connecting block clamping points 203b extends toward the interior of each corresponding one of the connecting block slides 203a at a distance h of 0.5-3.0 cm, and it is ensured that after each one of the first connecting blocks 103 completely enters each corresponding one of the first connecting grooves 203d, each one of the connecting block clamping points 203b can smoothly rebound to recover the initial state, and then the anti-slipping off effect is obtained. Moreover, the extending distance h of each one of the connecting block clamping points 203b is suitable, so the dismantling of the legs 2 can be smoothly implemented, ensuring the persistence and durability of the clamping and fixing of the legs 2.

After the clamping between the legs 2 and the center body 1 is completed, two groups of structures for realizing and strengthening the limiting and clamping effects exist between the legs 2 and the center body 1. The first clamping structure includes two parts, namely an upper stopper portion 107 disposed on the center body 1 and a leg upper protruding portion 207 disposed at the upper position of the front end of each one of the legs 2, wherein the two parts are matched to perform limiting, serving as the main part for clamping and fixing of the legs 2 and the center body 1, bearing a huge pressure applied by the center body 1 onto the legs 2, and ensuring the firmness of the five-star foot as a support structure. The second clamping structure includes two parts, namely a first mounting block stopper portion 101b and a second mounting block stopper portion 102b respectively disposed in the first mounting groove 101a and the second mounting groove 102a, wherein the two parts are matched with the clamped first mounting blocks 201 and the second mounting blocks 202. The first mounting block stopper portion 101b and the second mounting block stopper portion 102b are respectively clamped with each one of the first mounting blocks 201 and each one of the second mounting block 202 from the outer circular faces, so that the first mounting block stopper portion 101b and the second mounting block stopper portion 102b have the characteristic of narrowing from the top down and presenting circular arc shaped outer sides, ensuring further clamping and fixing of the first mounting blocks 201 and the second mounting blocks 202. On the other hand, the first mounting block stopper 101b and the second mounting block stopper 102b are respectively provided with first stopper protruding points 108 and second stopper protruding points 109, wherein each one of the first stopper protruding points 108 is docked and clamped with a first protruding point groove 208 formed on the outer circular face of each one of the mounting blocks 201 and each one of the second stopper protruding points 109 is docked and clamped with a second protruding point groove 209 formed on the outer circular face of each one of the second mounting blocks 202, further ensuring the stability of the clamping action of the legs 2 on the center body 1. In particular during installation of the five-star foot, the clamping effect of the first stopper protruding points 108 and the second stopper protruding points 109 is good enough to ensure that the clamping of the legs 2 and the center body 1 is not damaged when an installation person holds one of the legs 2 in hand, which means that the center body 1 does not fall down, thus avoiding accidents and finally ensuring the supporting effect of the five-star foot.

In this embodiment, on each one of the first mounting blocks 201 and on each one of the second mounting blocks 202, a wheel-shaped protrusion for forming each one of the first connecting blocks 203d is provided mounting block notches 210 for preventing large plastic materials from collapsing during molding. The mounting block notches 210 are circularly arrayed and uniformly distributed on each one of the wheel-shaped protrusions such that all of the first mounting blocks 201 and the second mounting blocks 202 have the characteristic of saving materials on the basis of possessing sufficient strength.

The above is detailed description of preferred embodiments of the present disclosure, but the present disclosure is not limited to the above embodiments. Those ordinarily skilled in the art can make various modifications with their own knowledge within the principle of the present disclosure. All of those modifications should fall within the protective scope of the Claims of the present disclosure.

What is claimed is:

1. A foldable five-star foot, comprising a center body (1) and five legs (2), which can be folded or unfolded characterized in that each one of the legs (2) is provided with a first mounting block (201) and a second mounting block (202), wherein the first mounting block (201) corresponds to a first mounting groove (101 a), the second mounting block (202) corresponds to a second mounting groove (102 a), the first mounting groove (101 a) and the second mounting groove (102 a) are formed on the center body (1); wherein the first mounting groove (101 a) and the second mounting groove (102 a) are both internally provided with a pair of a first connecting block (103) and a second connecting block (104), each one of the first connecting blocks (103) is connected with each corresponding one of the first mounting blocks (201), and each one of the second connecting blocks (104) is connected with each corresponding one of the second mounting blocks (202).

2. The foldable five-star foot of claim 1, characterized in that each one of the first mounting blocks (201) is provided with a first connecting groove (203 d); each one of the second mounting blocks (202) is provided a second connecting groove (204); each one of the first connecting grooves (203 d) is clamped with each corresponding one of the first connecting blocks (103) and each one of the second connecting grooves (204) is clamped with each corresponding one of the second connecting blocks (104) to connect and fix each corresponding one of the legs (2).

3. The foldable five-star foot of claim 2, characterized in that each one of the first mounting blocks (201) and each one of the second mounting blocks (202) are respectively provided with a connecting block slide (203 a) through which each one of the first connecting blocks (103) passes to enter each corresponding one of the first connecting grooves (203 d); a connecting block clamping point (203 b) which prevents each one of the first mounting blocks (201) from slipping out and protrudes toward an inside of each one of the connecting block slides (203 a) is disposed between each one of the connecting block slides (203 a) and each corresponding one of the first connecting grooves (203 d); and each one of the first connecting grooves (203 d) is provided with a clamping point open cavity (203 c) in which each one of the clamping block clamping points (203 b) deforms and rebounds.

4. The foldable five-star foot of claim 3, characterized in that a distance (h) from an end corner of each one of the connecting block clamping points (203 b) that protrudes toward each corresponding one of the connecting block slides (203 a) to a lateral side of each corresponding one of the connecting block slides (203 a) is 0.5-3.0 cm.

5. The foldable five-star foot of claim 1, characterized in that each one of the first connecting blocks (103) is provided with a first limiting block (105) for limiting and fixing each corresponding one of the unfolded legs (2), and each one of the first mounting blocks (201) and each one of the second mounting blocks (202) are provided with a first limiting portion (205) matched with each corresponding one of the first limiting blocks (105).

6. The foldable five-star foot of claim 5, characterized in that each one of the second connecting blocks (104) is provided with a second limiting block (106) for limiting and fixing each corresponding one of the unfolded legs (2); each one of the first mounting blocks (201) and each one of the second mounting blocks (202) are provided with a second unfolding limiting portion (206 b) and a second folding limiting portion (206 a), wherein each one of the second unfolding limiting portions (206b) and each one of the second folding limiting portions (206 a) are matched with each corresponding one of the second limiting blocks (106).

7. The foldable five-star foot of claim 6, characterized in that inner and outer sides of each one of the second limiting blocks (106) are two lateral faces which respectively correspond to each corresponding one of the second unfolding limiting portions (206 b) and each corresponding one of the second folding limiting portions (206 a), and are used to limit and fix each corresponding one of the legs (2); each one of the first limiting blocks (105) is provided with inside faces for limiting and fixing each corresponding one of the unfolded legs (2), and a vertical length and overall volume of each one of the second limiting blocks (106) are greater than a vertical length and overall volume of each one of the first limiting blocks (105).

8. The foldable five-star foot of claim 1, characterized in that the center body (1) is provided with five upper stopper portions (107), and each one of the legs (2) is provided with a leg upper protruding portion (207) which is matched with the upper stopper portion (107) for limiting and fixing each corresponding one of the legs (2).

9. The foldable five-star foot of claim 1, characterized in that the first mounting groove (101 a) is internally provided with a first mounting block stopper (101 b) which is clamped with the first mounting blocks (201) on each one of the folded legs (2), wherein the first mounting block stopper (101 b) is provided with first stopper protruding points (108), each one of the first mounting blocks (201) is provided with a first protruding point groove (208) which is clamped with each corresponding one of the first stopper protruding points (108); the second mounting groove (102 a) is internally provided with a second mounting block stopper (102 b) which is matched with the second mounting block (202) of each one of the folded legs (2), wherein the second mounting block stopper (102 b) is provided with each second stopper protruding points (109), and each one of the second mounting blocks (202) is provided with a second protruding point groove (209) which is clamped with each corresponding one of the second stopper protruding points (109).

10. The foldable five-star foot of claim 1, characterized in that each one of the first mounting blocks (201) and each one of the second mounting blocks (202) are respectively provided with mounting block notches (210).

\* \* \* \* \*